United States Patent
Endoh

(10) Patent No.: US 6,707,566 B1
(45) Date of Patent: Mar. 16, 2004

(54) DATA PROCESSING APPARATUS, PRINT PROCESSING APPARATUS, DATA PROCESSING METHOD OF DATA PROCESSING APPARATUS, PRINT PROCESSING METHOD OF PRINT PROCESSING APPARATUS, AND MEMORY MEDIUM STORING COMPUTER READABLE PROGRAMS THEREIN

(75) Inventor: Tomoaki Endoh, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/292,835

(22) Filed: Apr. 16, 1999

(30) Foreign Application Priority Data

Apr. 20, 1998 (JP) .......................................... 10-109644

(51) Int. Cl.[7] .......................... G06F 15/00; G03G 15/00; H04M 11/00
(52) U.S. Cl. ..................... 358/1.15; 358/1.15; 358/296; 399/1; 379/100.15
(58) Field of Search ............................. 358/1.15, 1.14, 358/296; 399/1; 379/100.15

(56) References Cited

U.S. PATENT DOCUMENTS

| | | | | |
|---|---|---|---|---|
| 5,003,583 A | | 3/1991 | Iggulden et al. ............ 379/100 |
| 5,819,015 A | * | 10/1998 | Martin ........................ 395/114 |
| 5,845,057 A | * | 12/1998 | Takeda et al. .............. 358/1.15 |
| 6,034,963 A | * | 3/2000 | Mianami et al. ............ 370/401 |
| 6,091,507 A | * | 7/2000 | Vatland et al. ............. 358/1.15 |
| 6,246,487 B1 | * | 6/2001 | Kobayashi .................. 358/1.13 |

FOREIGN PATENT DOCUMENTS

JP      5-61621     3/1993

OTHER PUBLICATIONS

Yu, S., et al., "A multimedia gateway for phone/fax and MIME mail", Computer Communications, NL, Elsevier Science Publishers BV, Amsterdam, vol. 20, No. 8, Aug. 25, 1997, pp. 615–627.

* cited by examiner

*Primary Examiner*—Kimberly Williams
*Assistant Examiner*—Saeid Ebrahimi
(74) *Attorney, Agent, or Firm*—Fitzpatrick, Cella, Harper & Scinto

(57) ABSTRACT

In a printing system in which a data processing apparatus and a plurality of print processing apparatuses can communicate via a communication medium, document data and print instruction data for each printer are transmitted from the data processing apparatus to a plurality of print processing apparatuses by a multicasting protocol. Thus, a print job is transmitted to a plurality of print processing apparatuses without enhancing a traffic on a network and the print job can be efficiently processed in parallel by a plurality of print processing apparatuses.

9 Claims, 14 Drawing Sheets

FIG. 18

MEM MAP OF MEM MEDIUM
(FD / CD-ROM)

| DIRECTORY |
|---|
| PROGRAM CODES FOR FLOWCHART OF FIG. 5 |
| PROGRAM CODES FOR FLOWCHART OF FIG. 9 |
| PROGRAM CODES FOR FLOWCHART OF FIG. 13 |
| PROGRAM CODES FOR FLOWCHART OF FIG. 17 |
| |

DATA PROCESSING APPARATUS, PRINT PROCESSING APPARATUS, DATA PROCESSING METHOD OF DATA PROCESSING APPARATUS, PRINT PROCESSING METHOD OF PRINT PROCESSING APPARATUS, AND MEMORY MEDIUM STORING COMPUTER READABLE PROGRAMS THEREIN

BACKGROUND OF THE INVENTION

1. Field of the Invention

The invention relates to a data processing apparatus, a print processing apparatus, a data processing method of the data processing apparatus, a print processing method of the print processing apparatus, and a memory medium on which computer readable processing programs have been stored in a printing system in which the data processing apparatus and a plurality of print processing apparatuses communicate via a communication medium.

2. Related Background Art

Hitherto, there is a printing system such that a data processing apparatus such as host computer, scanner, or the like to generate a print job and a plurality of print processing apparatuses are connected through a communication medium and a plurality of print processing apparatuses simultaneously process one print job in parallel, thereby improving a printing speed.

In this case, if the data processing apparatus for forming print data and a plurality of print processing apparatuses are connected via a network, means for transmitting the print data of the same print job to each print processing apparatus by the times of only the number of print processing apparatuses is used.

SUMMARY OF THE INVENTION

In the conventional technique, however, since the print data of the same print job is transmitted by the times of the number of print processing apparatuses, a traffic of the network increases. There is a problem such that the improvement of the speed of the printing system cannot be expected in the case where a data amount of the print job exceeds transmitting performance of the network or the like.

Therefore, it is intended to solve the above problem by using a multicasting protocol by which a certain transmitting source can transmit data to a plurality of transmission destinations by one transmission. When the transmitting source transmits print data by the multicasting protocol, one print data flows on a communication medium. The one print data flowing on a communication unit basis is received by a plurality of transmission destinations.

However, when one print job is transmitted to a plurality of print processing apparatuses by using the multicasting protocol, all of the print processing apparatuses process the same print job. There is, consequently, a problem such that different numbers of prints cannot be designated or different finishing processes cannot be designated every print processing apparatuses.

A job control command to delete, interrupt, or restart the print job sent to each print processing apparatus is also similarly transmitted by the times of only the number of print processing apparatuses, so that the traffic of the network increases. There is a problem such that the improvement of the speed of the printing system cannot be expected when a data amount of the job control command exceeds the transmitting performance of the network or the like.

The invention is made to solve the above problems. That is, it is an object of the invention to provide a printing system in which a data processing apparatus and a plurality of print processing apparatuses can communicate via a communication medium, wherein the data processing apparatus adds a print instruction to generated print data and transmits the print data and the print instruction to a plurality of print processing apparatuses by a multicasting protocol, and the print processing apparatus receives the print data and the print instruction transmitted to the own apparatus by the multicasting protocol and processes the print data in accordance with the print instruction.

Further, it is an object of the invention to provide a data processing apparatus in the above printing system, a print processing apparatus, a data processing method, a print processing method, a printing method, and a memory medium on which processing programs have been stored.

Thus, the print job is transmitted to a plurality of print processing apparatuses without enhancing a network traffic and the print job is efficiently processed in parallel by a plurality of print processing apparatuses.

BRIEF DESCRIPTION OF THE DRAWINGS

FIG. 18 is a diagram showing a memory map on a memory medium to store a program according to the invention.

DETAILED DESCRIPTION OF THE PREFERRED EMBODIMENTS

First Embodiment

Figure 1:
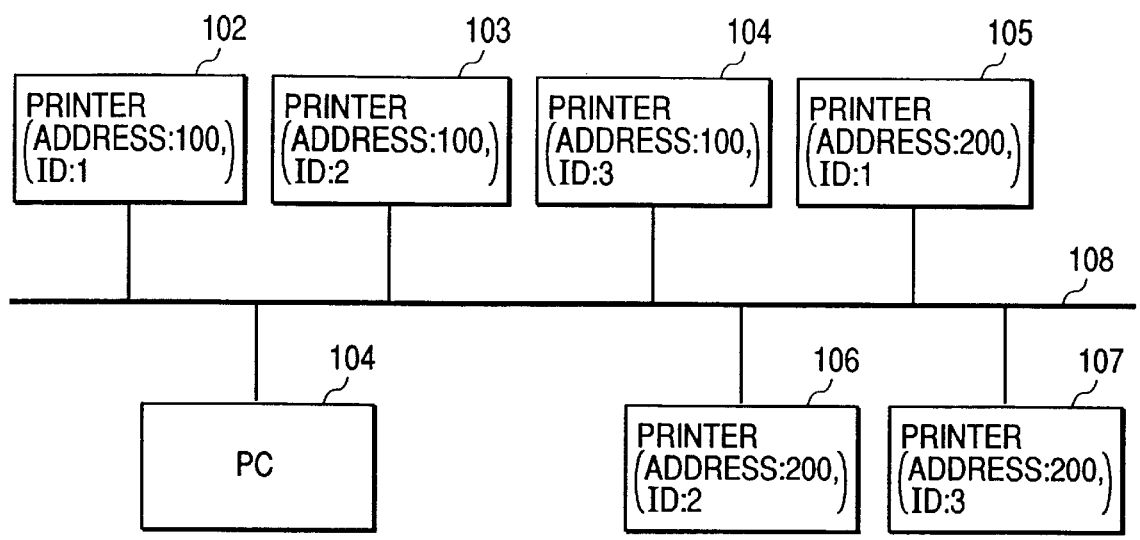
FIG. 1 is a block diagram showing a construction of a data processing system according to the invention.

FIG. 1 is a block diagram showing a construction of a printing system including a data processing apparatus and print processing apparatuses according to the first embodiment of the invention.

A data processing apparatus (PC) 101 and a plurality of printers 102 to 107 can communicate via a network 108.

In FIG. 1, reference numeral 101 denotes the data processing apparatus (PC) such as a personal computer or the like to generate a print job. An application program which operates on the PC activates a printer driver (which is stored into a memory resource such as a hard disk or the like and is loaded into an RAM and functions) constructing a part of the printing system of the invention. Thus, a print job is transmitted by a multicasting protocol.

The plurality of printers 102 to 107 interpret a print job which is sent from the PC 101 to the multicasting protocol and process the print job. A group address "100" or "200" to recognize a group of the printer when the print job is multicasted has been allocated to each of the printers 102 to 107.

In FIG. 1, the same group address "100" is allocated to the printers 102 to 104, the same group address "200" is allocated to the printers 105 to 107, and those printers construct each printer group.

A printer identifier (ID) to unconditionally distinguish each printer in the same group is allocated to each printer.

Ordinarily, in a multicasting protocol such as an IP (Internet Protocol) Multicast or the like, it is not guaranteed that a packet transmitted from a transmitting source certainly arrives at a transmission destination. There is, consequently, an inconvenience when the printing system is constructed. In the embodiment, therefore, to provide the reliability to the multicasting protocol such as an IP Multicast or the like, what is called a reliable multicasting protocol (described in, for example, T. A. Joseph and K. P. Birman (1989), "Reliable Broadcast Protocols", Distributed Systems, ACM Press, pages 293–317, 1989) is used.

Figure 2:
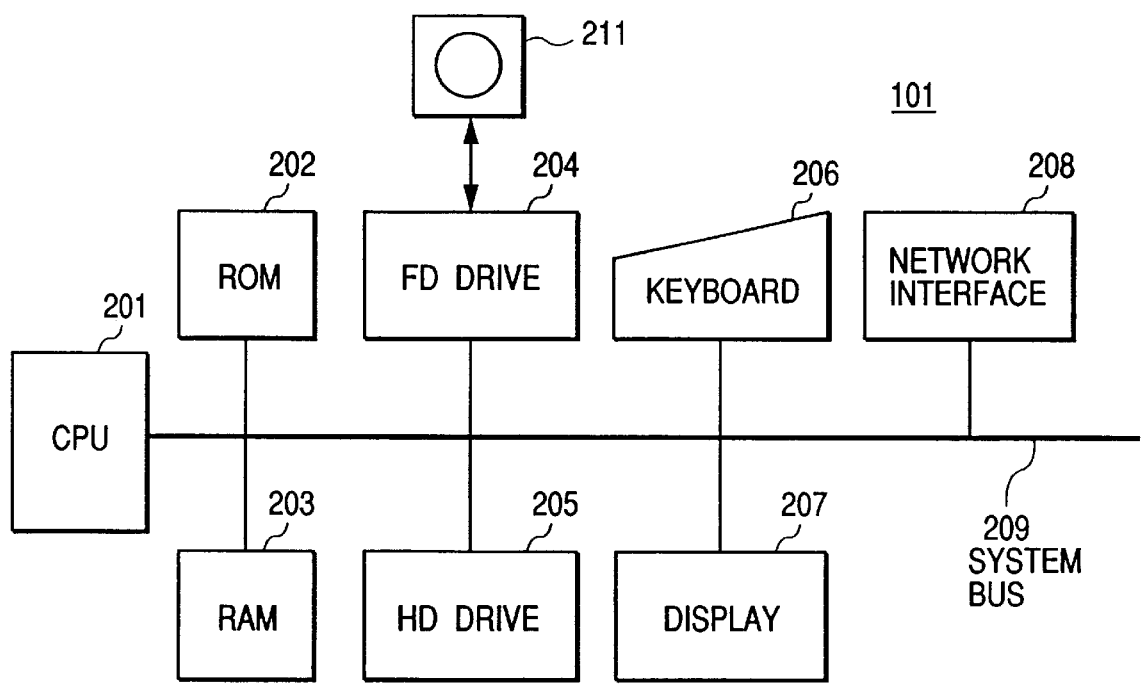
FIG. 2 is a block diagram showing a construction of a data processing apparatus shown in FIG. 1.

FIG. 2 is a block diagram showing a construction of the data processing apparatus 101 shown in FIG. 1.

In FIG. 2, reference numeral 201 denotes a CPU for performing a control of the whole apparatus, an arithmetic operating process, and the like; 202 an ROM as a memory area to store a system activating program, unchangeable information, and the like; and 203 an RAM as a data memory area without a use limitation in which programs shown in flowcharts, which will be explained hereinlater, and data are loaded. The CPU 201 executes various data processes on the basis of the system activating program, control program, data, and the like loaded in the RAM 203.

Reference numeral 208 denotes a network interface, through which the data processing apparatus 101 is connected to the network 108 and 204 indicates an external storing device (FD drive). The programs and data are stored onto a floppy disk 211 and are referred or loaded into the RAM 203 as necessary. Reference numeral 205 denotes an external storing device (HD drive). A system program or an application program loaded onto the RAM 203 uses data or information stored in the external storing device 205 as necessary.

Reference numeral 206 denotes a keyboard to transmit information of a pressed key to the CPU 201; 207 a display such as a CRT or the like; and 209 a system bus which should become a path of data that is transmitted and received among the above component elements.

Figure 3:
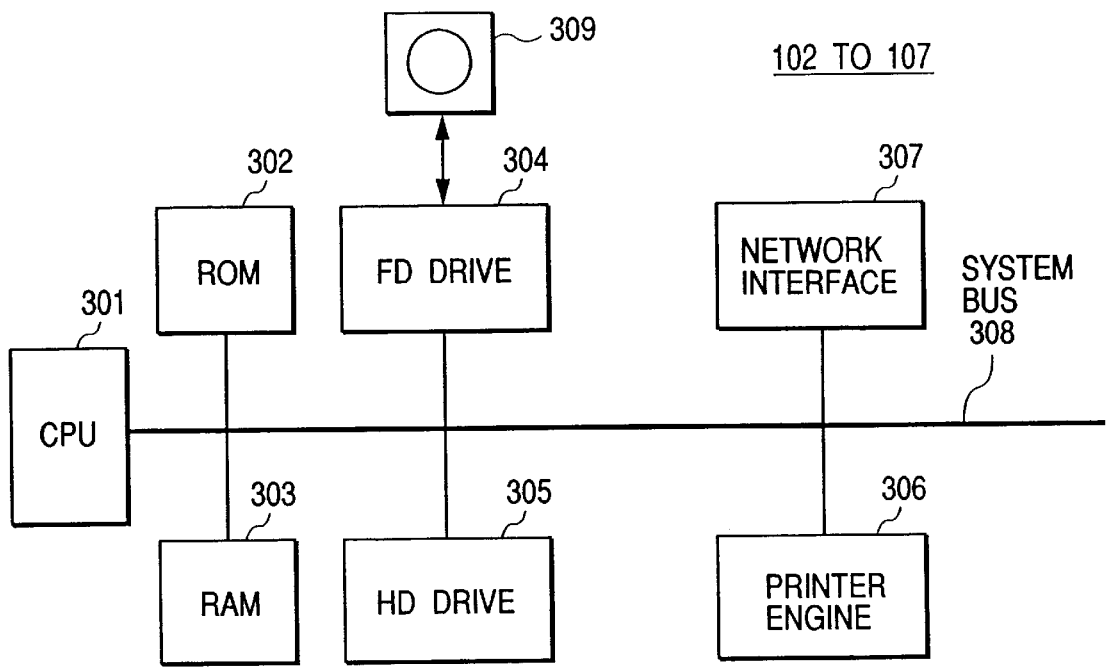
FIG. 3 is a block diagram showing a construction of a print processing apparatus shown in FIG. 1.

FIG. 3 is a block diagram showing an example of the printers 102 to 107 shown in FIG. 1.

In FIG. 3, reference numeral 301 denotes a CPU to perform a control of the whole apparatus, an arithmetic operating process, and the like; 302 an ROM in which the system activating program, unchangeable information, and the like have been stored; and 303 an RAM serving as an area (work area) in which the programs shown by flowcharts, which will be explained hereinlater, and data are loaded.

Reference numeral 304 denotes a floppy disk drive. The programs and data are stored in a floppy disk 309 and are referred or loaded into the RAM 303 as necessary. Reference numeral 305 denotes a hard disk drive from which a system program or a control program is read out and loaded into the RAM 303 and is activated. The activated system program or control program uses data or information stored on a hard disk as necessary.

Reference numeral 306 denotes a printer engine. The CPU 301 writes document data and a print instruction into a buffer area existing in the printer engine 306. Thus, the printer engine 306 prints onto a paper or performs a finishing process in response to the print instruction or the like. The document data is PDL data described by a PDL (page description language) or image data which was compressed or non-compressed.

The printer engine 306 writes data indicative of a status of the printer engine onto a built-in register. The CPU 301 can obtain the status of the printer engine 306 by reading out data from the register.

Reference numeral 307 denotes a network interface. The printer is connected to the network 108 via the network interface 307. Reference numeral 308 denotes a system bus which should become a path of data that is transmitted and received among the above component elements.

Figure 4:
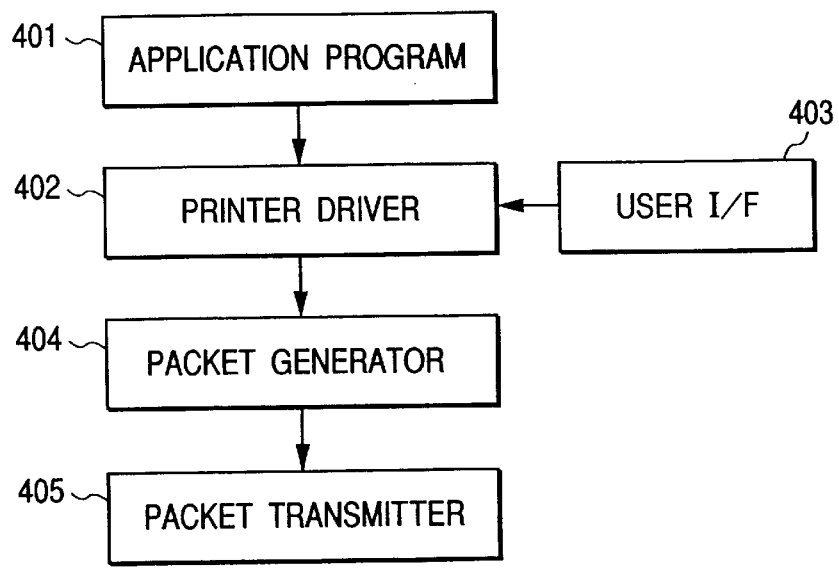
FIG. 4 is a block diagram showing a construction of a module to generate a print job in the data processing apparatus in the first embodiment.

FIG. 4 is a block diagram showing a construction of modules to generate the print job in the data processing apparatus 101 shown in FIG. 2. In FIG. 4, reference numeral 401 denotes an application program such as word processor, spreadsheet, or the like for allowing the display 207 to perform a graphical display. After the user formed data by the application program 401, he instructs the printing by the keyboard 206 or the like. Thus, the application program 401 activates a printer driver 402 and sends the data formed by the user to the printer driver 402. The application program 401 instructs the printer driver 402 to generate document data expressed by a PDL (page description language) or an image.

The printer driver 402 activates a user interface 403. The user interface 403 displays a dialog window for promoting the user to input a group address and printing conditions of the printer onto the display 207.

When the user inputs the group address and printing conditions of the printer by the user interface 403, the user interface 403 sends the inputted group address and printing conditions of the printer to the printer driver 402. A print instruction common to all of the printers and a print instruction to each printer are included in the printing conditions. The print instruction will be described hereinlater.

The printer driver 402 sends the formed document data to a packet generator 404 together with the group address and printing conditions of the printer. On the basis of the document data and printing conditions sent from the printer driver 402, the packet generator 404 generates a print job data packet to be transmitted to the printer and sends the print job data packet to a packet transmitter 405 together with the group address of the printer.

The print job data packet can be sequentially sent to the packet transmitter 405 in accordance with the order of data packets which are generated by the packet generator 404, or, after completion of the generation of all data packets, they can be also sent to the packet transmitter 405 in a lump.

The packet transmitter 405 transmits the print job data packet sent from the packet generator 404 toward the group address of the printer by the reliable multicasting protocol.

Figure 5:
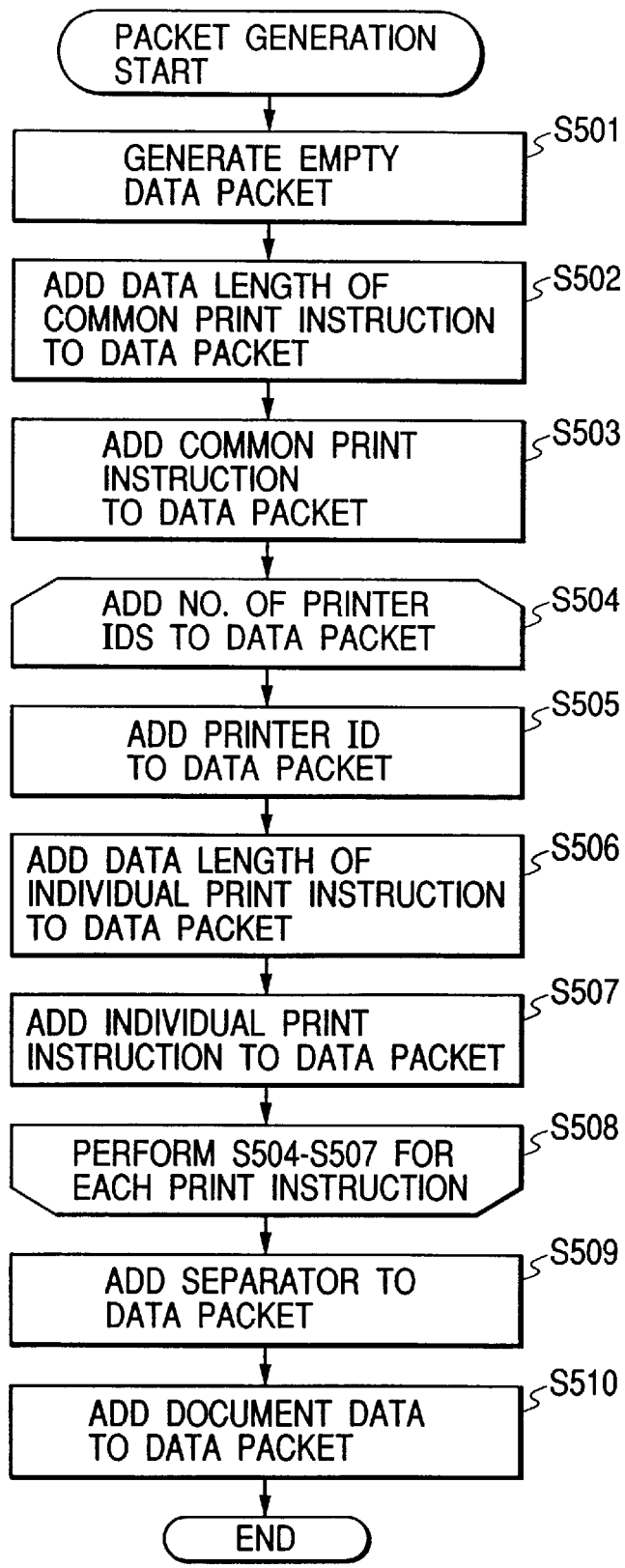
FIG. 5 is a flowchart showing the operation of a packet generator in the first embodiment.

FIG. 5 is a flowchart showing a procedure for a process to generate the print job data packet by the packet generator 404 in FIG. 4. S501 to S510 denote processing steps. First in step S501, an empty data packet (i.e., length 0) is generated. In step S502, a data length of a common print instruction, which will be explained hereinlater, is added (inserted) to the data packet. In step S503, data of the common print instruction that is common to all of the printers in the group is added to the data packet.

In step S504, the number of printer identifiers (IDs) is added to the data packet. In step S505, a printer ID of the printer to generate the print instruction is added to the data packet. In step S506, a data length of the print instruction to the printer having the printer ID added in step S505 is added to the data packet.

In step S507, the data of the print instruction to the printer having the printer ID added in step S505 is added to the data packet. All of the printers having the printer ID added in step S505 perform the printing process on the basis of the print instruction data added in step S507.

In step S508, the processes in steps S504 to S507 are repeated for each print instruction by the times of only the number of print instructions. For example, in case of transmitting the print job data packet to the group address "100" in FIG. 1, in the first cycle, an instruction to set the paper size to A4 is issued to the printers whose printer IDs are equal to 1 and 2. In the second cycle, an instruction to set the paper size to B4 is issued to the printer whose printer ID is equal to 3. Further, in the third cycle, an instruction to set the finishing process to "stapling" is issued to the printers whose printer IDs are equal to 1 and 3.

In step S509, a separator (0) to indicate the start of the document data is added to the data packet. In step S510, the document data is added to the data packet and the generating process of the data packet is finished.

As mentioned above, by adding the print instruction for each printer to the print job data packet, the printer can be allowed to perform a different printing process according to a processing ability of each printer.

Figure 6:
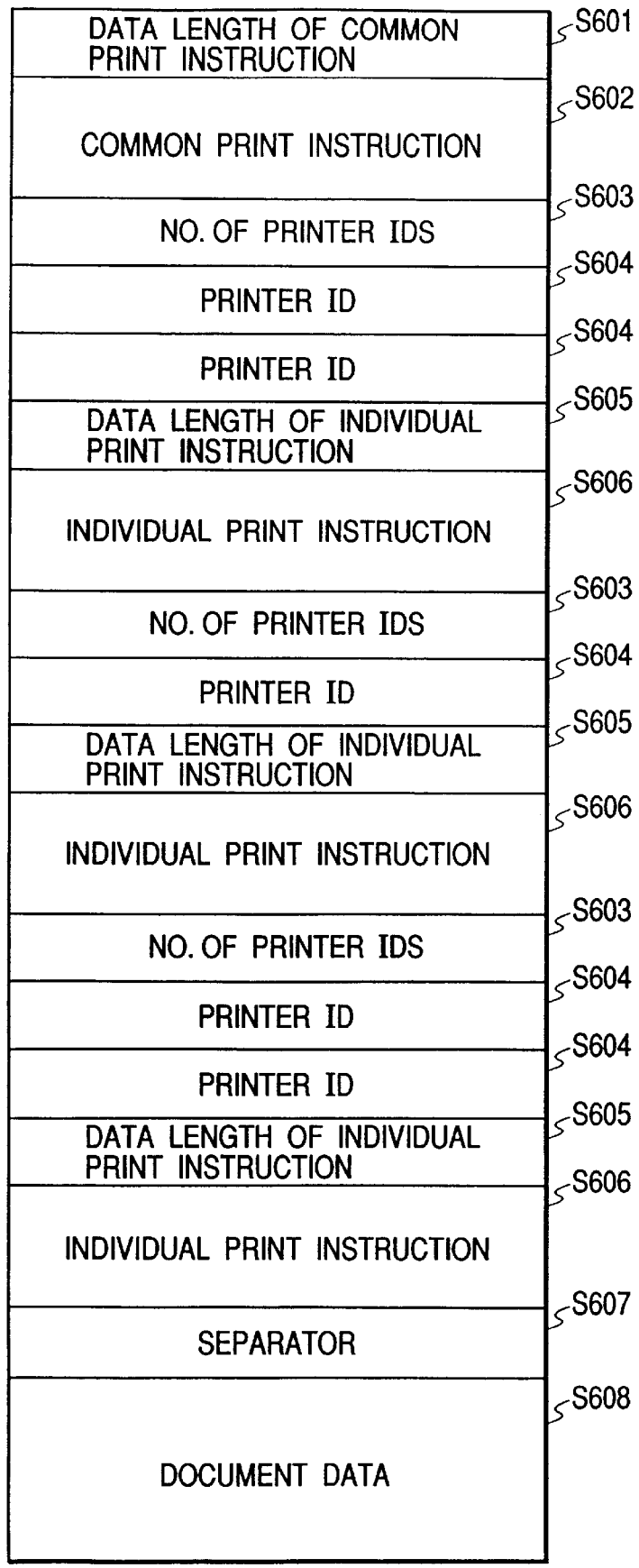
FIG. 6 is a diagram showing a construction of a print job data packet.

FIG. 6 is a diagram showing the print job data packet generated by the packet generator 404 shown in FIG. 4. In the diagram, the data length of the common print instruction, namely, the data length of the print instruction that is common to all of the printers in the group is stored into a work area 601. A common print instruction, namely, the data of the print instruction common to all of the printers in the group is stored into a work area 602. The number of printer IDs is stored into a work area 603.

The printer ID of the printer which issues the print instruction is stored into a work area 604. A data length of the print instruction for the printer corresponding to the printer ID stored in the area 604 is stored into a work area 605. Data of the print instruction for the printer corresponding to the printer ID stored in the area 604 is stored into a work area 606. A separator (for example, shown by "0") to indicate the start of document data is stored into a work area 607. The document data is stored into a work area 608.

Figure 7:
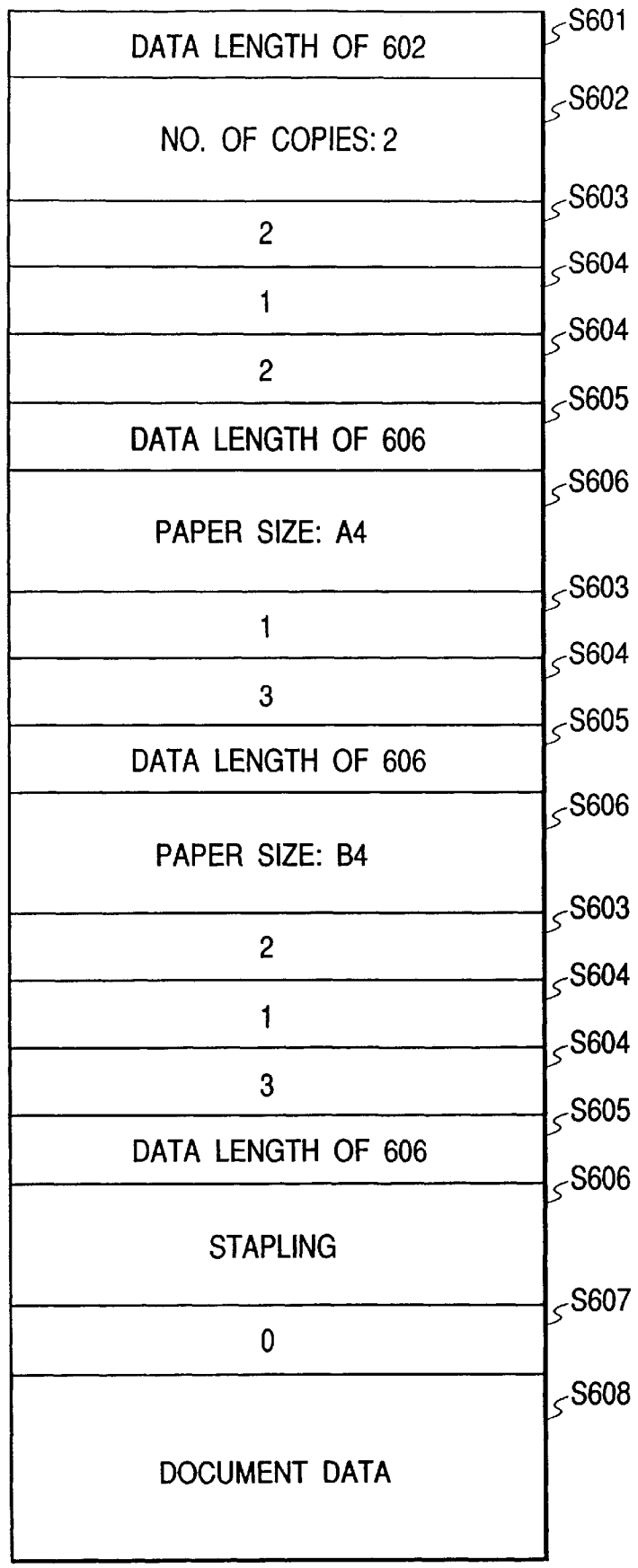
FIG. 7 is a diagram showing an example of the print job data packet.

FIG. 7 shows an example of the print job data packet for the printer whose group address is equal to "100".

Figure 8:
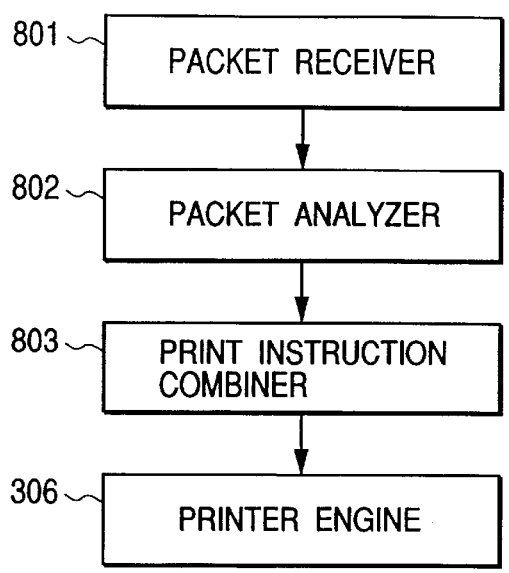
FIG. 8 is a block diagram showing a construction of a module to perform a printing process in the print processing apparatus in the first embodiment.

FIG. 8 is a block diagram showing the relation between the print processing module and printer engine in the printer shown in FIG. 3.

In FIG. 8, reference numeral 801 denotes a packet receiver to receive the print job data packet transmitted from the data processing apparatus 101 by the reliable multicasting protocol. The packet receiver 801 receives the print job data packet to the group address owned by the self printer and sends it to a packet analyzer 802.

The packet analyzer 802 analyzes the print job data packet sent from the packet receiver 801, extracts the print instruction data common to all of the printers, and sends it to a print instruction combiner 803. At the same time, the print instruction data for the printer ID of the own printer is obtained and sent to the print instruction combiner 803. Further, the packet analyzer 802 analyzes the print job data packet, obtains the document data, and sends it to the print instruction combiner 803.

The print instruction combiner 803 combines the common print instruction data inputted from the packet analyzer 802 and the print instruction data for the own printer and outputs a final print instruction to the printer engine 306. In the combination, the common print instruction data is used as a base and the print instruction data for the own printer is sequentially overwritten thereto in accordance with the receiving order. The print instruction combiner 803 sends the document data transmitted from the packet analyzer 802 to the printer engine 306.

The printer engine 306 prints the document data in accordance with the print instruction generated from the print instruction combiner 803.

Figure 9:
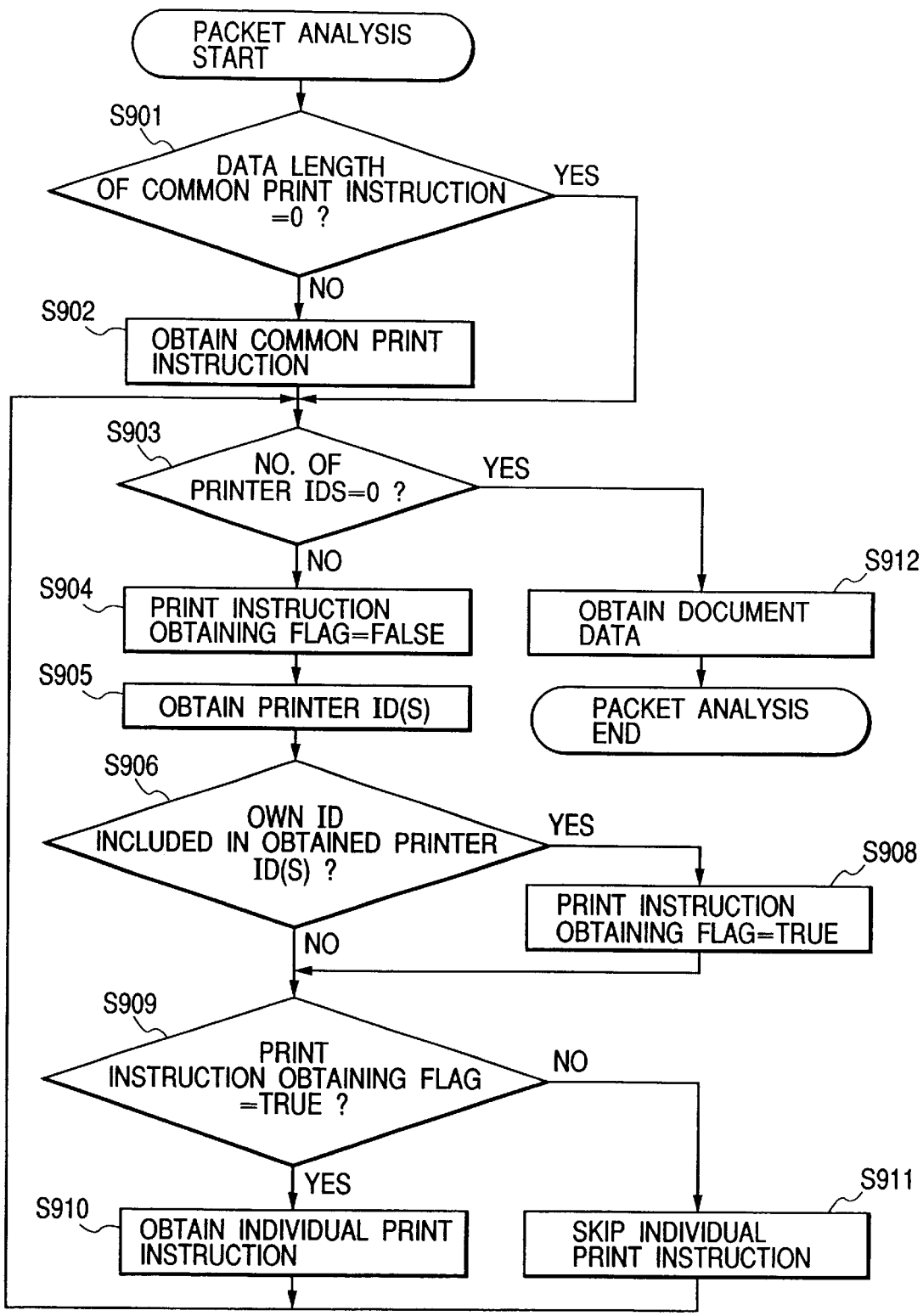
FIG. 9 is a flowchart showing the operation of a packet analyzer in the first embodiment.

FIG. 9 is a flowchart showing a procedure for a process to analyze the print job data packet by the packet analyzer 802 shown in FIG. 8. S901 to S912 denote processing steps.

First in step S901, a check is made to see if the data length of the common print instruction is equal to "0". When it is determined that the data length is equal to "0", the processing routine advances to step S903 and subsequent steps. If it is decided that the data length is not equal to "0" (No—step S901), the common print instruction data is obtained in step S902.

In step S903, subsequently, whether the number of printer IDs is equal to "0" or not is discriminated. When it is decided that the number of printer IDs is equal to "0" (Yes—step S903), it is determined that there is the separator 607. The document data is derived in step S912.

When it is determined in step S903 that the number of printer IDs is not equal to "0" (No—step S903), a print instruction obtaining flag is set to "false" in step S904. The print instruction obtaining flag is information showing whether the print instruction is obtained or not in step S909. The print instruction obtaining flag is held in the RAM 303 in each printer.

In step S905, the printer IDs of only the number of printers are obtained. In step S906, a check is made to see if the printer ID (own ID) that is equal to the printer ID of the own printer is included in the obtained printer IDs, namely, whether the next print instruction data is for the own printer or not is discriminated.

If it is determined that the own ID is included in the obtained printer IDs (Yes—step S906), the print instruction obtaining flag is set to "true".

If it is decided in step S906 that the own ID is not included in the obtained printer IDs (No—S906), step S909 follows.

In step S909, a check is made to see if the print instruction obtaining flag is "true" or "false". When it is decided that the print instruction obtaining flag is "true" (Yes—S909), the data length of the print instruction stored in the area 605 is extracted and the print instruction data as much as the data length is derived. The processing routine is returned to step S903.

If it is determined that the print instruction obtaining flag is "false" in step S909 (No—step S909), the data length 605 of the print instruction is extracted and the print instruction data as much as the length is skipped. The processing routine is returned to step S903.

According to the above embodiment, by merely supplying one print job data packet onto the communication medium, a plurality of print processing apparatuses can individually receive the print job data packet. In the embodiment, therefore, even if the number of print processing apparatuses increases, an increase in traffic on the communication medium is suppressed and the deterioration of the transfer ability of the communication medium can be avoided.

Further, according to the embodiment, a different printing process according to the processing ability of each print processing apparatus can be instructed every print processing apparatus. Therefore, the number of prints, a paper size, a finishing process, and the like can be made different every print processing apparatus.

Second Embodiment

In the above first embodiment, the printing system such that one print job is transmitted from the data processing apparatus to a plurality of printers by the multicasting protocol has been described. However, it is also possible to realize a copying system such that document data read by a scanner connected to the data processing apparatus side is transmitted to a plurality of printers by the multicasting protocol. Such an embodiment will now be described hereinbelow. Portions different from the first embodiment will now be explained.

Figure 10:
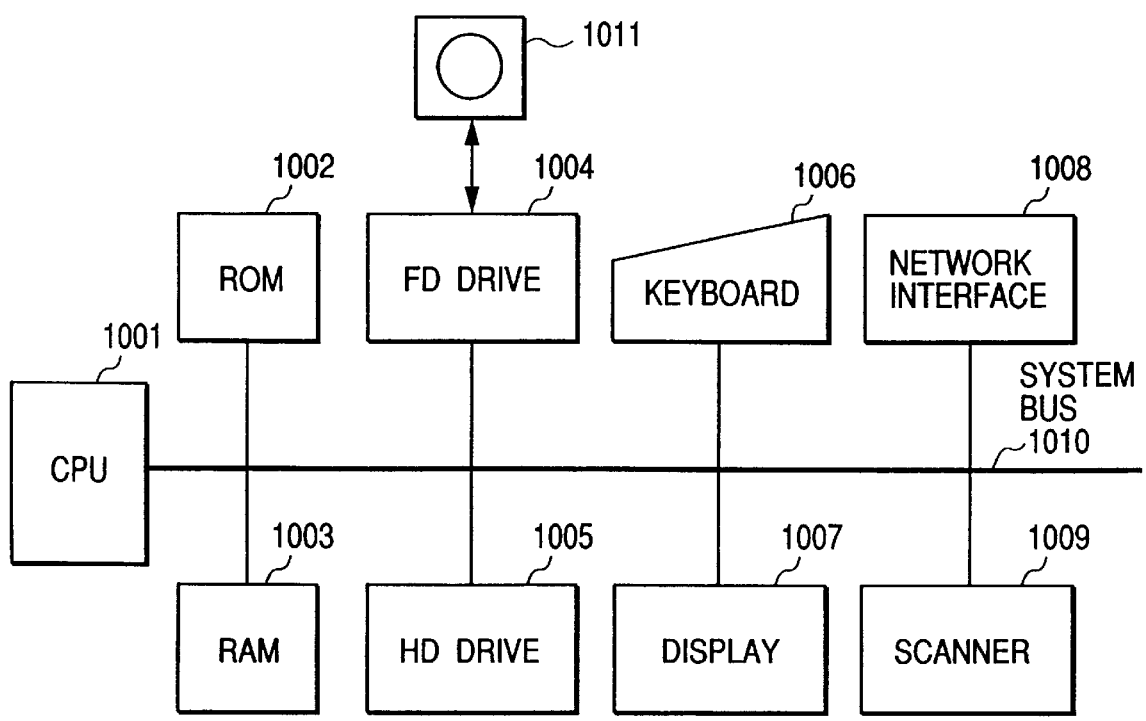
FIG. 10 is a block diagram showing a construction of a data processing apparatus in the second embodiment.

FIG. 10 is a block diagram showing a construction of the data processing apparatus side in the copying system.

In FIG. 10, reference numeral 1001 denotes a CPU to perform a control of the whole apparatus, an arithmetic operating process, and the like; 1002 an ROM to store a system program, unchangeable information, and the like; and 1003 an RAM serving as a work area in which various programs shown by flowcharts, which will be explained hereinlater, and data are loaded. Reference numeral 1004 denotes a floppy disk drive. The programs and data are stored onto a floppy disk 1011 and are referred or loaded into the RAM 1003 as necessary. Reference numeral 1005 denotes a hard disk drive from which the system program or control program is loaded onto the RAM 1003 and activated. As system program or control program, data or information stored on a hard disk of the hard disk drive 1005 is used as necessary.

Reference numeral 1006 denotes a keyboard to transfer information of a pressed key to the CPU 1001; 1007 a display constructed by a CRT or the like; and 1008 a network interface. The data processing apparatus is connected to the network 108 via the network interface 1008.

Reference numeral 1009 denotes a scanner to scan a document and generate image data. The generated image data is stored into the RAM 1003 or onto the hard disk of the hard disk drive 1005.

Reference numeral 1010 denotes a system bus which should become a path of data that is transmitted and received among the above component elements.

Figure 11:
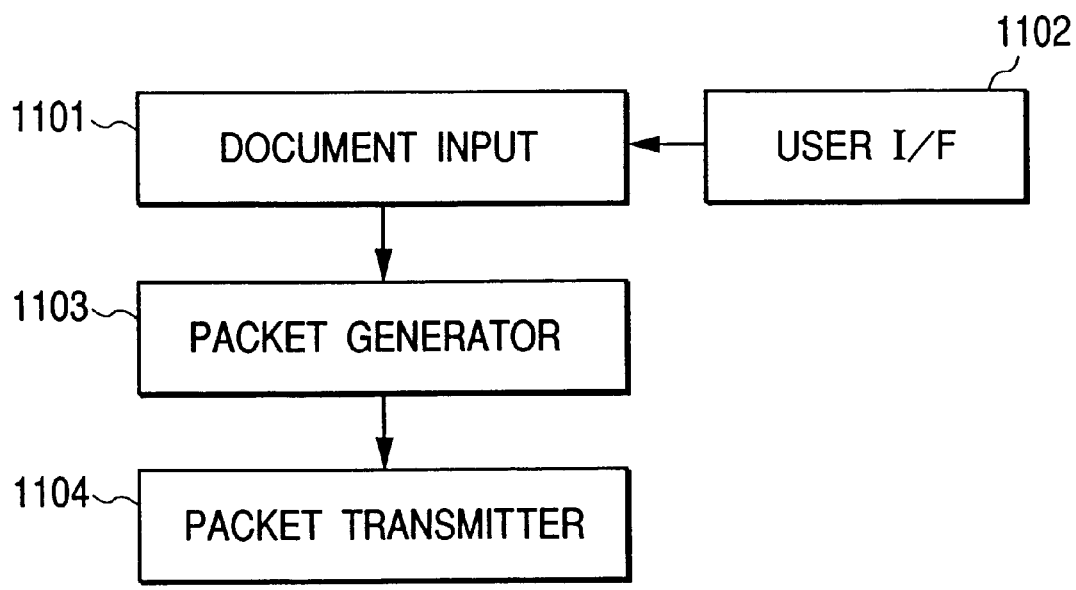
FIG. 11 is a block diagram showing a construction of a module to generate a print job in the data processing apparatus in the second embodiment.

FIG. 11 is a block diagram showing the relation between a module to generate a print job to copy and scanner resources.

In FIG. 11, reference numeral 1101 denotes a document input and 1102 indicates a user interface. A dialog window to allow the user to input scanning conditions of a document, a group address and printing conditions of the printer, and the like is displayed onto the display 1007 via the user interface 1102.

When the user inputs the scanning conditions of the document and the group address and printing conditions of the printer via the user interface 1102, the user interface 1102 sends the scanning conditions of the document and the group address and printing conditions of the printer which were inputted to the document input 1101.

The document input 1101 including the scanner 1009 scans the document in accordance with the inputted scanning conditions and generates document data. The document data and the group address and printing conditions of the printer are sent to a packet generator 1103. A print instruction common to all of the printers and a print instruction to each printer are included in the printing conditions.

The packet generator 1103 generates a print job data packet to be transmitted to the printer on the basis of the document data and printing conditions inputted from the document input 1101. The packet generator 1103 sends the generated print job data packet and the group address of the printer to a packet transmitter 1104.

After that, the packet generator 1103 and packet transmitter 1104 in FIG. 11 operate in a manner similar to the packet generator 404 and packet transmitter 405 in FIG. 4.

Third Embodiment

In the first and second embodiments, the cases of the printing system and copying system in which the print job is transmitted to a plurality of printers by the multicasting protocol have been described. However, it is also possible to similarly construct such that a control command is transmitted to a plurality of printers and a job management (deletion, interruption, restart, and the like) and an equipment management (power on, power off, and the like) are performed by the multicasting protocol. Such an embodiment will now be described hereinbelow. Portions different from the first embodiment will now be described.

Figure 12:
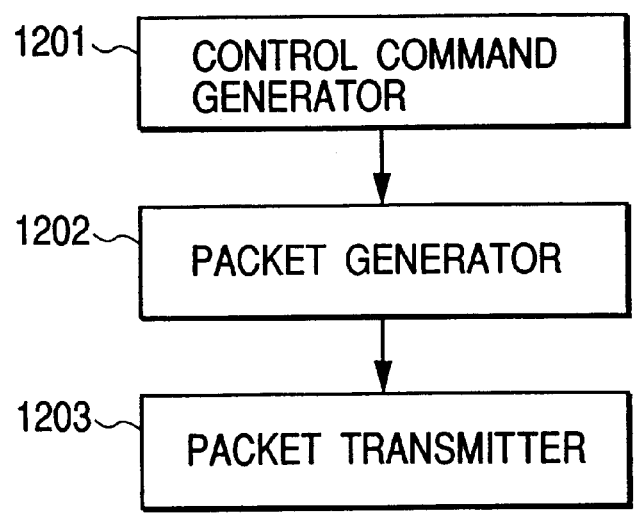
FIG. 12 is a block diagram showing a construction of a module to generate a control command in a data processing apparatus in the third embodiment.

FIG. 12 is a block diagram showing a construction of a data processing apparatus in the third embodiment of the invention. The data processing apparatus in the embodiment is similar to the data processing apparatus 101 shown in FIG. 1 and its system construction is similar to that shown in FIG. 2.

In FIG. 12, reference numeral 1201 denotes a control command generator, by which a dialog window for allowing the user to input a group address of the printer and a management command of a job/equipment is displayed on the output display 207 by using the user interface function.

When the user inputs the group address of the printer and the management command of the job/equipment by the dialog window, the control command generator 1201 sends the group address of the printer and the management command of the job/equipment which were inputted to a packet generator 1202. A management command (deletion of the job, power off, etc.) of the job/equipment that is common to all of the printers and a management command (interruption of the job, restart, etc.) of the job/equipment for each printer are included in the management command of the job/equipment. The management command of the job/equipment is generally called a control command.

The packet generator 1202 generates a control command data packet that is transmitted to a plurality of printers from the control command by the multicasting protocol. The control command data packet and the group address of the printer are sent to a packet transmitter 1203.

The packet transmitter 1203 transmits the control command data packet toward the group address of the printer by the reliable multicasting protocol.

A characteristic construction of the embodiment will now be described hereinbelow with reference to FIGS. 13 to 16.

Figure 13:
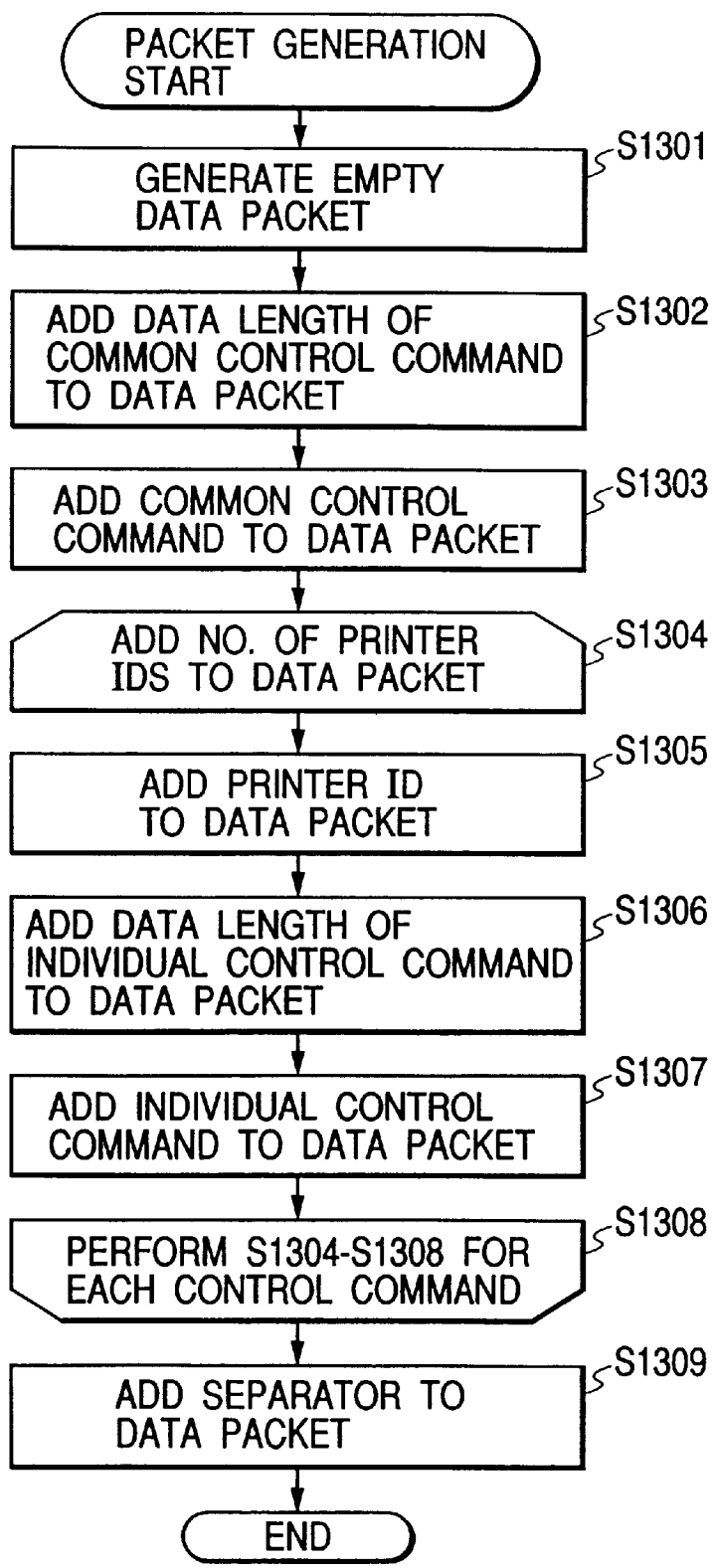
FIG. 13 is a flowchart showing the operation of a packet generator in the third embodiment.

FIG. 13 is a flowchart showing a process to generate the control command data packet by the packet generator 1202 in FIG. 12. S1301 to S1309 denote processing steps.

First in step S1301, an empty data packet of a length "0" is generated. In step S1302, a data length of a common control command that is common to all of the printers in the group is added to the data packet. In step S1303, the data of the common control command is added to the data packet.

In step S1304, the number of printer IDs is added to the data packet. In step S1305, the printer ID is added to the data packet. In step S1306, the data length of a control command for the printer having the printer ID added in step S1305 is added to the data packet. In step S1307, subsequently, the control command data for the printer having the printer ID added in step S1305 is added to the data packet.

All of the printers each having the printer ID added in step S1305 perform a management of the job/equipment on the basis of the individual control command data added in step S1307.

In step S1308, the processes in steps S1304 to S1307 are repeated by the number of times of only the number of control commands. For example, in case of transmitting the control command data packet to the group address "100" in FIG. 1, in the first cycle, an instruction to delete the job is issued to the printers whose printer IDs are equal to 1 and 2. In the second cycle, an instruction to interrupt the job is issued to the printer whose printer ID is equal to 3.

Finally, in step S1309, the separator "0" indicative of the end of the control command data packet is added to the data packet.

Figure 14:
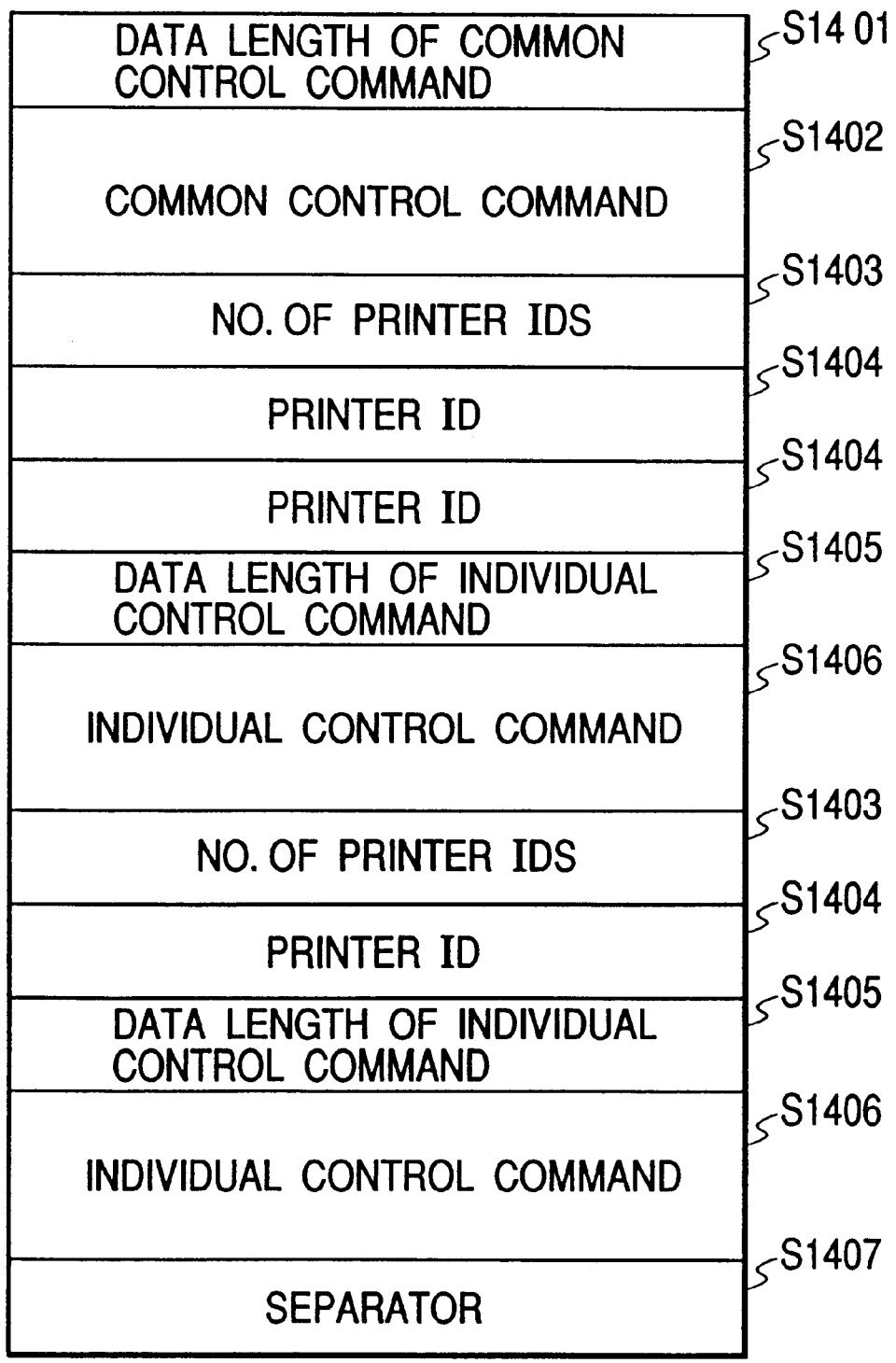
FIG. 14 is a diagram showing a construction of a control command data packet.

FIG. 14 is a diagram showing the control command data packet generated by the packet generator 1202 shown in FIG. 12. In FIG. 14, a data length of a common control command that is common to all of the printers in the group is stored into a work area 1401. Data of the common control command is stored into a work area 1402.

The number of printer IDs is stored into a work area 1403. The printer ID is stored into a work area 1404. A data length of the individual control command for the printer having the printer ID stored in the area 1404 is stored into a work area 1405. Control command data for the printer having the printer ID is stored into a work area 1406. Finally, a separator "0" indicative of the end of the control command data packet is stored into a work area 1407.

Figure 15:
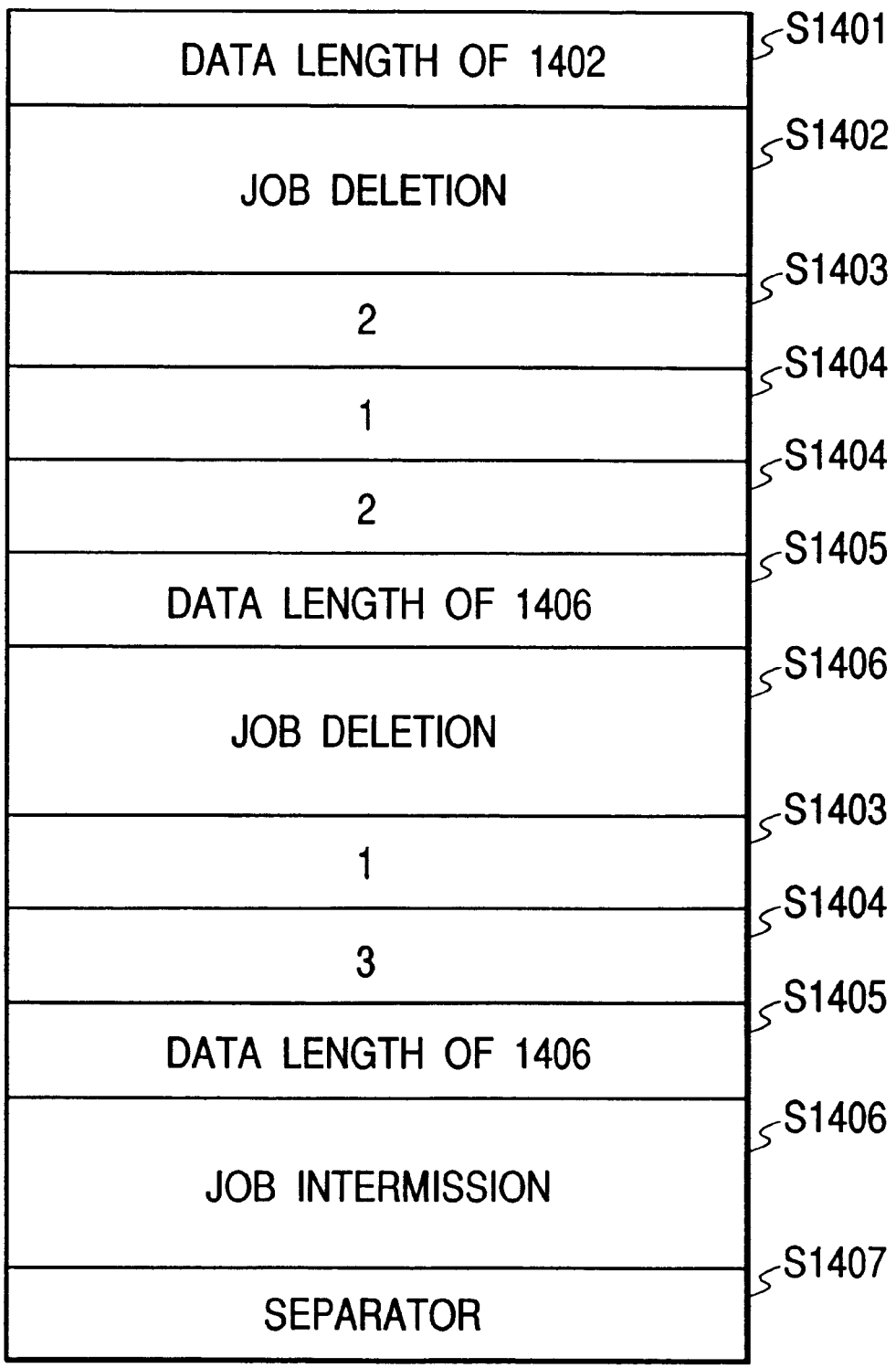
FIG. 15 is a diagram showing an example of the control command data packet.

FIG. 15 shows an example of a control command data packet for the printer whose group address is equal to "100".

Figure 16:
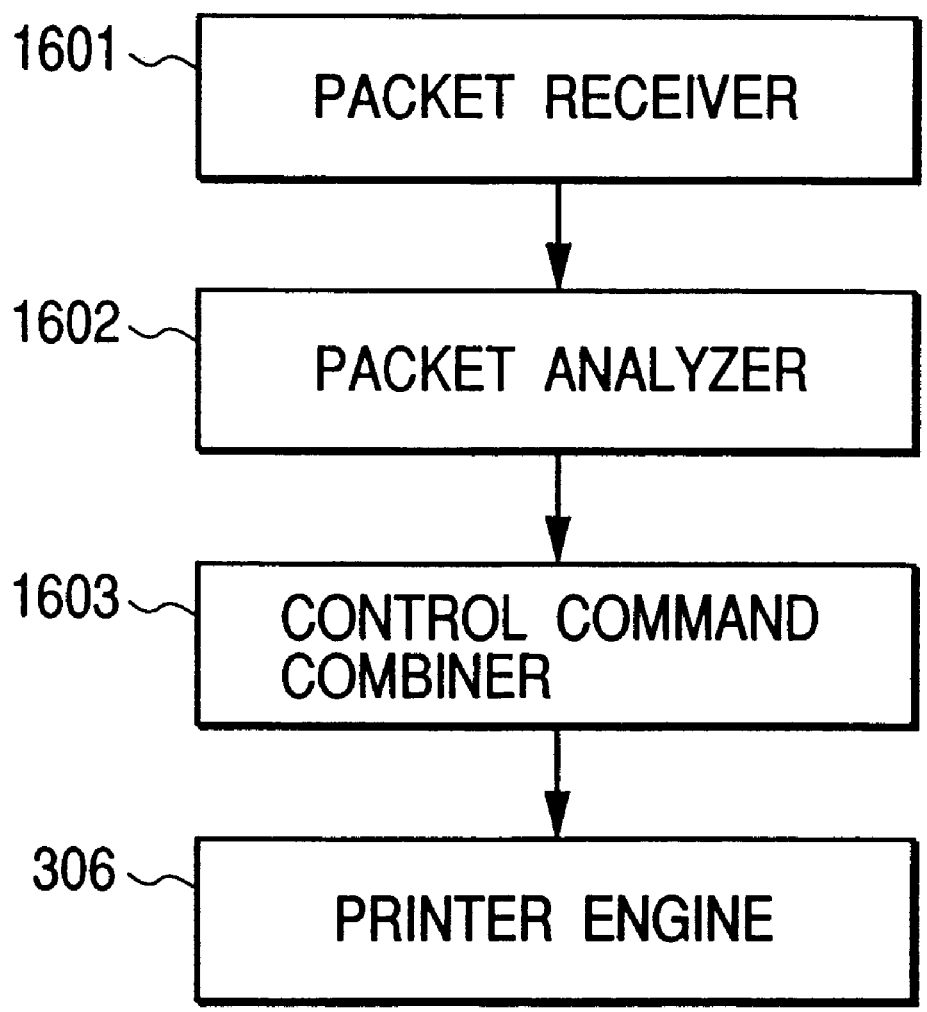
FIG. 16 is a block diagram showing a construction of a module to perform a printing process in a print processing apparatus in the third embodiment.

FIG. 16 is a block diagram showing the relation between a job/equipment control module and a printer engine in the printer shown in FIG. 3.

In FIG. 16, reference numeral 1601 denotes a packet receiver for receiving the control command data packet transmitted from the data processing apparatus 101 by the reliable multicasting protocol. The packet receiver 1601 receives the control command data packet to the group address owned by the self printer and sends it to a packet analyzer 1602.

The packet analyzer 1602 analyzes the control command data packet sent from the packet receiver 1601, extracts the control command data that is common to all of the printers, and sends it to a control command combiner 1603. At the same time, control command data for the own printer ID is obtained and sent to the control command combiner 1603.

The control command combiner 1603 combines the common control command data inputted from the packet analyzer 1602 and the control command data for the own printer and outputs a final control command to the printer engine 306. In the combination, the common control command data is used as a base and the control command data to the own printer is sequentially overwritten thereto in accordance with the receiving order.

In the printer engine 306, the control of the job/equipment is performed in accordance with the control command outputted from the control command combiner 1603.

Figure 17:
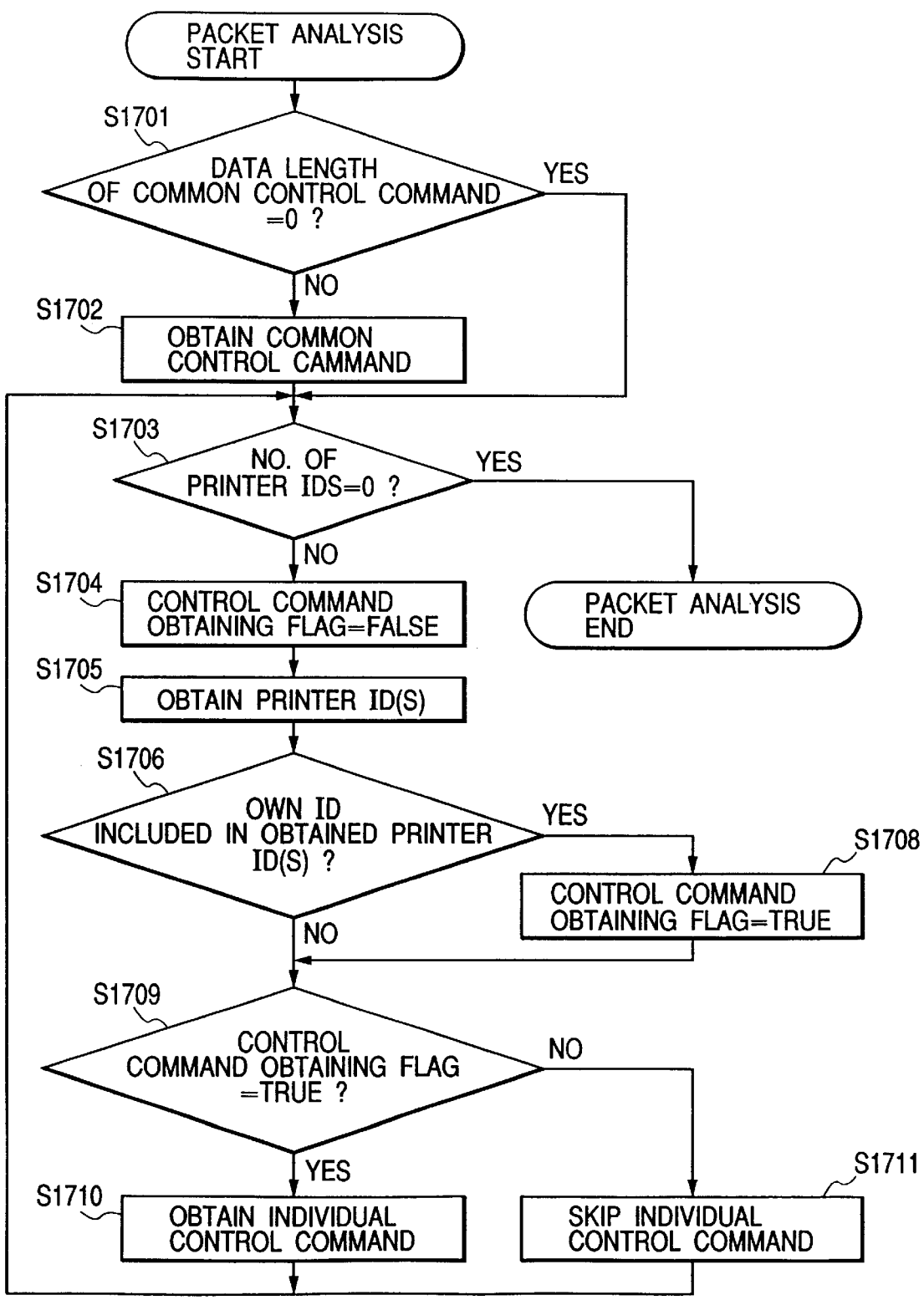
FIG. 17 is a flowchart showing the operation of a packet analyzer in the third embodiment.

FIG. 17 is a flowchart showing a process to analyze the control command data packet by the packet analyzer 1602 in FIG. 16. S1701 to S1711 denote processing steps.

First in step S1701, a check is made to see if a data length of the common control command is equal to "0". When it is determined that the data length is equal to "0" (Yes—S1701), step S1703 follows. If it is decided that the data length is not equal to "0" (No—step S1701), the common control command is obtained in step S1702.

Subsequently, in step S1703, a check is made to see if the number of printer IDs is equal to "0". When it is determined that the number of printer IDs is equal to "0" (Yes—step S1703), it is determined that there is the separator 1407. The processing routine is finished.

When it is determined in step S1703 that the number of printer IDs is not equal to "0" (No—step S1703), the control command obtaining flag is set to "false" in step S1704. The control command obtaining flag is information showing whether the individual control command is obtained or not in step S1710.

In step S1705, the printer IDs of only the number of printers are obtained. In step S1706, whether a printer ID (own ID) that is equal to the printer ID of the own printer is included in the obtained printer IDs or not, namely, whether the next control command is for the own printer or not is discriminated.

When it is determined that the own ID is included in the obtained printer IDs (Yes—step S1706), the control command obtaining flag is set to "true". When it is decided in step S1706 that the own ID is not included in the obtained printer IDs (No—step S1706), step S1709 follows.

In step S1709, whether the control command obtaining flag is "true" or not is discriminated. When it is determined that the control command obtaining flag is "true" (Yes—step S1709), in step S1710, the data length 1406 of the control command is obtained and the control command data as much as the data length is obtained. The processing routine is returned to step S1703.

If it is decided in step S1709 that the control command obtaining flag is "false" (No—step S1709), in step S1711, the date length of the control command is obtained and the control command data as much as the data length is skipped. The processing routine is returned to step S1703.

According to the embodiment, by merely supplying one control command data packet onto the communication medium, a plurality of print processing apparatuses can individually receive the control command data packet. In the embodiment, therefore, even if the number of print processing apparatuses increases, an increase in traffic on the communication medium is suppressed and the deterioration of the transfer ability of the communication medium can be avoided.

Further, according to the embodiment, a different managing instruction can be outputted every print processing apparatus. Therefore, an instruction such as to delete the job in a certain printer and to interrupt the job in the other printer can be generated.

Fourth Embodiment

A construction of a processing program according to the invention will now be described hereinbelow with reference to a memory map shown in FIG. 18. FIG. 18 is a diagram showing a memory map of a memory medium to store the processing program according to the invention.

Although not particularly shown, information to manage programs which are stored onto the memory medium, for example, version information, names of persons who made the programs, and the like are also stored. There is also a case where information depending on the OS or the like of the apparatus to read out the program, for example, an icon to identify and display the program and the like are stored.

Further, data depending on the various programs is also managed in the directory. There is also a case where a program to install various programs into a computer, and in the case where the program to install has been compressed, a program to decode the compressed program, and the like are stored.

The functions shown in FIGS. 5, 9, 13, and 17 in the first to third embodiments can be also provided by a method whereby a CPU executes a program that is installed from the outside.

That is, it will be obviously understood that the object of the invention is accomplished by a method whereby a recording medium on which program codes of software to realize the functions of the first to third embodiments have been recorded is supplied to a system or an apparatus and a computer (or a CPU or an MPU) of the system or apparatus reads out the program codes stored on the recording medium and executes them.

In this case, the program codes themselves read out from the recording medium realize the novel functions of the invention and the recording medium on which the program codes have been stored constructs the invention. As a recording medium on which the program codes have been stored, for example, a floppy disk, a hard disk, an optical disk, a magnetooptic disk, a CD-ROM, a CD-R, a magnetic tape, a non-volatile memory card, an ROM, an EEPROM, or the like is used.

It will be obviously understood that the invention incorporates not only a case where the functions of the first to third embodiments are realized by executing the program codes read out by the computer but also a case where the OS (operating system) or the like which is operating on the computer executes a part or all of the actual processes on the basis of instructions of the program codes and the functions of the foregoing embodiments are realized by those processes.

Further, it will be obviously understood that the invention incorporates a case where after the program codes read out from the memory medium were written into a memory provided for a function expanding board inserted in a computer or a function expanding unit connected to the computer, a CPU or the like provided for the function expanding board or function expanding unit executes a part or all of the actual processes on the basis of instructions of the program codes, and the functions of the foregoing embodiments are realized by those processes.

In the first to third embodiments, the print processing apparatus and the data processing apparatus have individually been described. However, it will be obviously understood that the printing system comprising the print processing apparatus and the data processing apparatus constructs the invention.

What is claimed is:

1. A data processing apparatus able to communicate with a plurality of print processing apparatuses comprising:
generating means for generating print data that includes document data and print instruction data formed based on data entered via a user interface, which is adapted to enter different print conditions respectively for the plurality of print processing apparatuses; and
transmitting means for transmitting data formed based on the print data generated by said generating means to each of the plurality of print processing apparatuses,
wherein each of the plurality of print processing apparatuses processes the data transmitted by said transmitting means.

2. An apparatus according to claim 1, wherein the print instruction data comprises a common print instruction common to the plurality of print processing apparatuses and respective individual print instructions for the plurality of print processing apparatuses, and each of the plurality of print processing apparatuses processes the transmitted data based on the common print instruction and a corresponding individual print instruction.

3. A printing system in which a data processing apparatus is able to communicate with a plurality of print processing apparatuses,
wherein the data processing apparatus comprises:
generating means for generating print data that includes document data and print instruction data formed based on data entered via a user interface, which is adapted to enter different print conditions respectively for the plurality of print processing apparatuses; and
transmitting means for transmitting data formed based on the print data generated by said generating means to each of the plurality of print processing apparatuses, and
wherein each of the print processing apparatuses comprises:
receiving means for receiving the data transmitted from the data processing apparatus; and
processing means for processing the data received by said receiving means.

4. A data processing method in a data processing apparatus, which is able to communicate with a plurality of print processing apparatuses, said method comprising:
a generating step of generating print data that includes document data and print instruction data formed based on data entered via a user interface, which is adapted to enter different print conditions respectively for the plurality of print processing apparatuses; and a transmitting step of transmitting data formed based on the print data generated in said generating step to each of the plurality of print processing apparatuses, wherein each of the plurality of print processing apparatuses processes the data transmitted in said transmitting step.

5. A method according to claim 4, wherein the print instruction data comprises a common print instruction common to the plurality of print processing apparatuses and respective individual print instructions for the plurality of print processing apparatuses, and each of the plurality of print processing apparatuses processes the transmitted data based on the common print instruction and a corresponding individual print instruction.

6. A printing method in a printing system in which a data processing apparatus is able to communicate with a plurality of print processing apparatuses, said printing method comprising:

a data processing method; and a print processing method, wherein said data processing method comprises:

a generating step of generating print data that includes document data and print instruction data formed based on data entered via a user interface, which is adapted to enter different print conditions respectively for the plurality of print processing apparatuses; and a transmitting step of transmitting data formed based on the print data generated in said generating step to each of the plurality of print processing apparatuses, and wherein said print processing method comprises:

a receiving step of receiving the data transmitted in said transmitting step; and a processing step of processing the data received in said receiving step.

7. A recording medium on which is stored a processing program for a data processing apparatus, which is able to communicate with a plurality of print processing apparatuses, wherein the processing program comprises:

code for a generating step of generating print data that includes document data and print instruction data formed based on data entered via a user interface, which is adapted to enter different print conditions respectively for the plurality of print processing apparatuses; and code for a transmitting step of transmitting data formed based on the print data generated in the generating step to each of the plurality of print processing apparatuses, wherein each of the plurality of print processing apparatuses processes the data transmitted in the transmitting step.

8. A recording medium according to claim 7, wherein the print instruction data comprises a common print instruction common to the plurality of print processing apparatuses and respective individual print instructions for the plurality of print processing apparatuses, and each of the plurality of print processing apparatuses processes the transmitted data based on the common print instruction and a corresponding individual print instruction.

9. A recording medium on which is stored a processing program for a printing system in which a data processing apparatus is able to communicate with a plurality of print processing apparatuses, wherein the processing program comprises a data processing program and a print processing program, wherein the data processing program comprises:

code for a generating step of generating print data that includes document data and print instruction data formed based on data entered via a user interface, which is adapted to enter different print conditions respectively for the plurality of print processing apparatuses; and code for a transmitting step of transmitting data formed based on the print data generated in the generating step to each of the plurality of print processing apparatuses, and wherein the print processing program comprises:

code for a receiving step of receiving the data transmitted in the transmitting step; and code for a processing step of processing data formed based on the data received in the receiving step.

* * * * *